United States Patent [19]

Potts et al.

[11] Patent Number: 5,145,727
[45] Date of Patent: Sep. 8, 1992

[54] MULTILAYER NONWOVEN COMPOSITE STRUCTURE

[75] Inventors: David C. Potts, Dunwoody; George A. Young, Atlanta; Dennis S. Everhart, Alpharetta; J. Gavin MacDonald, Decatur; Ronald S. Nohr, Roswell, all of Ga.

[73] Assignee: Kimberly-Clark Corporation, Neenah, Wis.

[21] Appl. No.: 618,352

[22] Filed: Nov. 26, 1990

[51] Int. Cl.$^5$ .................. B32B 5/24; B32B 31/20; B32B 33/00; D04H 3/14; D04H 3/16

[52] U.S. Cl. ....................... 428/198; 15/223; 15/209.1; 156/62.4; 156/62.6; 156/62.8; 156/308.4; 428/286; 428/287; 428/288; 428/296; 428/302; 428/409; 428/422; 428/447

[58] Field of Search .............. 156/62.4, 62.6, 62.8, 156/308.4; 428/198, 286, 287, 288, 296, 302, 409; 15/209 R, 223

[56] References Cited

U.S. PATENT DOCUMENTS

| Re. 32,514 | 10/1987 | Steklenski | 524/32 |
| D. 239,566 | 4/1976 | Vogt | D59/2 R |
| D. 264,512 | 5/1982 | Rogers | D59/2 B |
| 3,016,599 | 1/1962 | Perry, Jr. | 28/78 |
| 3,341,394 | 9/1967 | Kinney | . |
| 3,652,374 | 3/1972 | Condon | 161/57 |
| 3,655,862 | 4/1972 | Dorschner et al. | 264/290 |
| 3,692,618 | 9/1972 | Dorschner et al. | . |
| 3,704,198 | 11/1972 | Prentice | . |

(List continued on next page.)

FOREIGN PATENT DOCUMENTS

| 1049682 | 2/1979 | Canada . |
| 0260011A2 | 3/1988 | European Pat. Off. . |
| 2506667 | 12/1975 | Fed. Rep. of Germany . |
| 61/155437 | 7/1986 | Japan . |
| GB87/00211 | 10/1987 | PCT Int'l Appl. . |

OTHER PUBLICATIONS

*Chemical and Engineering News*, Jul. 16, 1990, pp. 28–29.

D. R. Thompson et al., "New Fluorochemicals for Protective Clothing," INDA-TEC 90 Conference, Jun. 5–8, 1990.

(List continued on next page.)

Primary Examiner—James C. Cannon
Attorney, Agent, or Firm—William E. Maycock

[57] ABSTRACT

A nonwoven composite structure is provided which has at least two melt-extruded nonwoven layers:

(A) a first layer which includes at least a portion of a first nonwoven web; and (B) a second layer which includes at least a portion of a second nonwoven web;

in which, (1) the boundary between any two adjacent melt-extruded nonwoven layers is indistinct in that fibers at or near the surfaces of such adjacent layers are significantly intermingled;

(2) the fibers of at least one of such first and second layers are prepared by melt extrusion through a die at a shear rate of from about 50 to about 30,000 sec$^{-1}$ and a throughput of no more than about 5.4 kg/cm/hour of a mixture of an additive and a thermoplastic polymer, which additive imparts to the surfaces of the fibers, as a consequence of the preferential migration of the additive to the surfaces of the fibers as they are formed, at least one characteristic which is different from the surface characteristics of fibers prepared from the thermoplastic polymer alone, said preferential migration taking place spontaneously upon the formation of the fibers without the need for a post-formation treatment of any kind;

(3) the additive present in any melt-extruded nonwoven layer does not migrate to an adjacent layer to a significant degree in use, so that the surface characteristics of each layer remain substantially as originally prepared; and (4) the composite has been pattern bonded by the application of heat and pressure.

29 Claims, 1 Drawing Sheet

U.S. PATENT DOCUMENTS

| | | | |
|---|---|---|---|
| 3,705,068 | 12/1972 | Dobo et al. | 156/441 |
| 3,738,884 | 6/1973 | Shoehngen | 156/167 |
| 3,755,527 | 8/1973 | Keller et al. | 264/210 F |
| 3,770,562 | 11/1973 | Newman | |
| 3,802,817 | 4/1974 | Matsuki et al. | 425/66 |
| 3,849,241 | 11/1974 | Butin et al. | |
| 3,853,651 | 12/1974 | Porte | 156/63.6 |
| 3,855,046 | 12/1974 | Hansen et al. | 161/150 |
| 3,926,873 | 12/1975 | Aishima et al. | 525/36 |
| 3,969,313 | 7/1976 | Aishima et al. | 523/202 |
| 3,973,068 | 8/1976 | Weber | 28/198 |
| 3,978,185 | 8/1976 | Buntin et al. | 264/93 |
| 4,039,711 | 8/1977 | Newman | 428/286 |
| 4,041,203 | 8/1977 | Brock et al. | 428/157 |
| 4,064,605 | 12/1977 | Akiyama et al. | 28/103 |
| 4,070,218 | 1/1987 | Weber | 156/167 |
| 4,091,140 | 5/1978 | Harmon | 428/288 |
| 4,100,319 | 7/1978 | Schwartz | 428/171 |
| 4,100,324 | 7/1978 | Anderson et al. | 428/288 |
| 4,104,340 | 8/1978 | Ward | 264/6 |
| 4,118,531 | 10/1978 | Hauser | 428/224 |
| 4,196,245 | 4/1980 | Kitson et al. | 428/198 |
| 4,287,251 | 9/1981 | King et al. | 428/198 |
| 4,340,563 | 7/1982 | Appel et al. | 264/518 |
| 4,374,888 | 2/1983 | Bornslaeger | 428/198 |
| 4,375,718 | 3/1983 | Wadsworth | 29/592 |
| 4,377,615 | 3/1983 | Suzuki et al. | 428/213 |
| 4,405,297 | 9/1983 | Appel et al. | 425/72 S |
| 4,434,204 | 2/1984 | Hartman | 428/198 |
| 4,436,780 | 3/1984 | Hotchkiss et al. | 428/198 |
| 4,446,090 | 5/1984 | Lovgren et al. | 264/211 |
| 4,480,009 | 10/1984 | Berger | 428/447 |
| 4,493,868 | 1/1985 | Meitner | 428/171 |
| 4,499,149 | 2/1985 | Berger | 428/447 |
| 4,508,113 | 4/1985 | Malaney | 128/132 D |
| 4,535,113 | 8/1985 | Foster et al. | 524/262 |
| 4,555,811 | 12/1985 | Shimalla | 2/51 |
| 4,578,414 | 3/1986 | Sawyer et al. | 524/310 |
| 4,588,457 | 5/1986 | Crenshaw et al. | 156/62.8 |
| 4,604,313 | 8/1986 | McFarland et al. | 428/172 |
| 4,610,915 | 9/1986 | Crenshaw et al. | 428/219 |
| 4,618,524 | 10/1986 | Groitzsch et al. | 428/198 |
| 4,627,811 | 12/1986 | Greiser et al. | 425/72 S |
| 4,644,045 | 2/1987 | Fowells | 526/348 |
| 4,652,489 | 3/1987 | Crass et al. | 428/337 |
| 4,655,757 | 4/1987 | McFarland et al. | 604/366 |
| 4,659,777 | 4/1987 | Riffle et al. | 525/100 |
| 4,663,220 | 5/1987 | Wisneski et al. | 428/221 |
| 4,668,566 | 5/1987 | Braun | 428/286 |
| 4,689,362 | 8/1987 | Dexter | 524/266 |
| 4,698,388 | 10/1987 | Ohmura et al. | 525/88 |
| 4,714,647 | 12/1987 | Shipp et al. | 428/212 |
| 4,724,114 | 2/1988 | McFarland et al. | 264/510 |
| 4,745,142 | 5/1988 | Ohwaki et al. | 524/87 |
| 4,753,843 | 6/1988 | Cook et al. | 428/286 |
| 4,761,322 | 8/1988 | Raley | 428/198 |
| 4,766,029 | 8/1988 | Brock et al. | 428/286 |
| 4,772,510 | 9/1988 | McClure | 428/286 |
| 4,778,460 | 10/1988 | Braun et al. | 604/380 |
| 4,784,892 | 11/1988 | Storey et al. | 428/172 |
| 4,818,585 | 4/1989 | Shipp, Jr. | 428/198 |
| 4,818,597 | 4/1989 | DaPonte et al. | 428/284 |
| 4,855,360 | 8/1989 | Duchesne et al. | 525/187 |
| 4,857,251 | 8/1989 | Nohr et al. | 264/103 |
| 4,863,983 | 9/1989 | Johnson et al. | 524/140 |
| 4,904,521 | 2/1990 | Johnson et al. | 428/284 |
| 4,906,513 | 3/1990 | Kebell et al. | 428/198 |
| 4,923,914 | 5/1990 | Nohr et al. | 524/99 |

OTHER PUBLICATIONS

*Chem. Abstr.*, 105:192786s (1986).

*Chem. Abstr.*, 84:91066z (1976).

R. H. Somani and M. T. Shaw, *Macromolecules*, 14, 886–888 (1981).

S. N. Pandit et al., *Polymer Composites*, 2, 68–74 (1981).

V. A. Wente, "Superfine Thermoplastic Fibers," *Industrial and Engineering Chemistry*, vol. 48, No. 8, pp. 1342–1346 (1956).

V. A. Wente et al., "Manufacture of Superfine Organic Fibers," Navy Research Laboratory, Washington, D.C., NRL Report No. 4364.

R. R. Buntin and D. T. Lohkamp, *Journal of the Technical Association of the Pulp and Paper Industry*, vol. 56, pp. 74–77 (1973).

MULTILAYER NONWOVEN COMPOSITE STRUCTURE

CROSS-REFERENCE TO RELATED APPLICATIONS

A multilayer laminated nonwoven structure in which the layers have surface characteristics similar to those of the layers of the composite structure of the present invention is described and claimed in copending and commonly assigned application Ser. No. 618,354, entitled MULTILAYER NONWOVEN LAMINIFEROUS STRUCTURE, filed of even date in the names of David C. Potts, George A. Young, Dennis S. Everhart, J. Gavin MacDonald, and Ronald S. Nohr.

BACKGROUND OF THE INVENTION

The present invention relates to a nonwoven composite structure having at least two melt-extruded nonwoven layers. More particularly, the present invention relates to a nonwoven composite structure having at least two melt-extruded layers in which the fibers of at least one layer are prepared by melt extrusion of a mixture of an additive and a thermoplastic polymer, which additive imparts to the surfaces of said fibers, as a consequence of the preferential migration of said additive to the surfaces of said fibers as they are formed, at least one characteristic which is different from the surface characteristics of fibers prepared from said thermoplastic polymer alone.

Multilayer nonwoven composites and laminates are not new, although the earlier structures differ significantly from those provided by the present invention. By way of illustration, some of the earlier structures are described in the paragraphs which follow.

U.S. Pat. No. 3,770,562 to Newman discloses a composite nonwoven fabric. A soft and flexible spunbonded web is impregnated with a soft thermoplastic binder, dried, then plied by heat and pressure to at least one substantially binder-free fibrous layer. Such fibrous layer typically is a sheet of cellulose tissue, rayon, or cotton card or garnett web, or the like.

U.S. Pat. Nos. 3,973,068 and 4,070,218 to Weber describe a soft, nonwoven web which is produced by adding directly to a thermoplastic polymer at the time of extrusion a lubricating agent having and HLB number in the range of 8 to 20 and a molecular weight in the range of from 200 to 4,000. The lubricating agent is uniformly distributed into the polymer as extruded into filaments. The lubricating agent is forced to the surfaces of the fibers by subjecting the formed web to a stringent heat treatment.

European Patent Application No. 87307470.2, Publication No. 0 260 011 A2, describes fluorochemical oxazolidinones. The compounds are stated to be particularly useful as additives in synthetic organic polymer melts which, when melt-extruded, give fibers and films having low surface energies, oil and water repellency, and resistance to soiling. Suitable polymers include polyamides, polyesters, and polyolefins. ZONYL® fluorochemicals recently were advertised in the Jul. 16, 1990 issue of *Chemical and Engineering News* as additives for polymers which migrate to the surface and orient themselves with their perfluoroalkyl groups facing outward. Other references relating to the incorporation of fluorochemicals into such polymers as polyolefins include, among others, D. R. Thompson et al., "New Fluorochemicals for Protective Clothing," IN-DA-TEC 90 Conference, Jun. 5-8, 1990 and U.S. Pat. Nos. 4,855,360 to Duchesne et al. and 4,863,983 to Johnson et al.

Low-temperature-spinnable polypropylene compositions for the preparation of spunbonded nonwovens are described in published Japanese Patent Application No. 61,155,437 [*Chem. Abstr.*, 105:192786s (1986). The compositions contain a crystal-nucleating agent, e.g., 0.065 percent bis(1-tert-butylperoxy-1-methylethyl)benzene and 0.2 percent dibenzylidenesorbitol.

U.S. Pat. No. 3,969,313 to Aishima et al. describes thermoplastic composite compositions comprising a thermoplastic material, a polyolefin, and a reactive inorganic filler. The filler is prepared by the reaction of a metal carbonate, hydroxide, or oxide with a defined unsaturated aliphatic or aromatic carboxylic acid. See also U.S. Pat. No. 3,926,873, also to Aishima et al., which describes a similar composition lacking the polyolefin component.

A method of making a structural member from a prepeg sheet of fusible resin microfibers and heat-resistant reinforcing fibers is described in U.S. Pat. No. 4,104,340 to Ward. Alternating layers of fusible resin microfibers and heat-resistant reinforcing fibers such as glass fibers are formed on a moving forming wire. The resulting multi-layered sheet then is molded under heat and pressure to form the structural member.

U.S. Pat. No. 4,196,245 to Kitson et al. discloses a composite nonwoven fabric comprising adjacent microfine fibers in layers. The fabric comprises at least two hydrophobic plies of microfine fibers and at least one nonwoven cover ply which may be an apertured film, a spunbonded ply, or an air-laid, wet-laid, or carded ply of fibers. The hydrophobic plies typically are prepared by meltblowing.

A disposable absorbent nonwoven structure is described in U.S. Pat. No. 4,287,251 to King and Boyd. The structure comprises alternate layers of absorbent nonwoven material and nonwoven hydrophobic thermoplastic material, minimally bonded together. The absorbent layers may comprise spunbonded rayon webs or webs or air-laid, wet-laid, or carded rayon fibers of staple length.

U.S. Pat. No. 4,375,718 to Wadsworth and Hersh describes a method of making an electrostatically charged filtration medium. Briefly, a web made of nonconductive thermoplastic fibers is contacted on each side with a more conductive web to form a combined web. The combined web is charged with electrically charged particles from corona charging elements on opposite sides of the web. The nonconductive web typically is made from polypropylene fibers.

A nonwoven fabric and a method for its production is disclosed in U.S. Pat. No. 4,377,615 to Suzuki and Igaue. The fabric comprises an upper layer having a substantially smooth surface and a lower layer having a density lower than that of the upper layer. Both layers are fibrous and contain adhesive bonding materials.

U.S. Pat. No. 4,436,780 to Hotchkiss et al. describes a nonwoven wiper laminate. The laminate consists of a relatively high basis weight middle layer of meltblown thermoplastic microfibers and, on either side, a lightweight layer of generally continuous filament thermoplastic fibers having a larger fiber diameter. A preferred laminate consists of a polypropylene meltblown layer having on either side a polypropylene spunbonded layer. A similar material is described in U.S. Pat. No.

4,906,513 to Kebbell and Watts, in which the center meltblown layer has mixed therein other fibers or particles. See also U.S. Pat. No. 4,374,888 to Bornslaeger which describes a similar laminate for a recreation fabric, in which the outer layers are treated for resistance to ultraviolet radiation and/or flame retardancy. A two-layered meltblown-spunbonded fabric is disclosed in U.S. Pat. No. 4,041,203 to Brock and Meitner, and a three-layered fabric comprising a carded web sandwiched between two spunbonded layers is described in U.S. Pat. No. 4,039,711 to Newman.

U.S. Pat. No. 4,508,113 to Malaney describes a microfine fiber laminate. A preferred embodiment comprises a three-ply hydrophobic microfine fiber structure sandwiched between and fuse-bonded to two layers of conjugate fibers having a low melting sheath and a high melting core. The inner ply of the three-ply structure is relatively high melting while the two outer plies are low melting.

An extensible microfine fiber laminate is disclosed in U.S. Pat. No. 4,555,811 to Shimalla. A preferred embodiment comprises an inner creped hydrophobic microfine fiber structure sandwiched between and bonded to two reinforcing layers of nonwoven fibers. The inner structure may comprise two or more plies bonded together, which plies preferably are prepared by meltblowing a thermoplastic polymer. The reinforcing layers preferably consist of spunbonded webs made up of sheath/core bicomponent fibers.

U.S. Pat. No. 4,604,313 to McFarland and Lang relates to the selective layering of superabsorbents in meltblown substrates. A first layer of meltblown fibers containing wood fibers is formed on a continuous foraminous belt. A second layer is formed on the first layer, the second layer containing both wood fibers and a superabsorbent and being integrally connected to the first layer. See also U.S. Pat. Nos. 4,655,757 and 4,724,114, both also to McFarland and Lang.

U.S. Pat. No. 4,610,915 to Crenshaw et al. relates to a two-ply nonwoven fabric laminate. The first ply is a synthetic fibrous nonwoven material and the second ply is a fibrous nonwoven material. The two plies are bonded together by means of a flexible, soft latex binder which penetrates each ply to a depth of from about 20% to about 80% of its thickness. The first ply typically is a spunbonded web made from a thermoplastic polymer, the most common of which are rayon, polyester, polypropylene, and nylon. The second ply can be an air-laid or a wet-laid cellulosic pulp sheet, with a tissue sheet being preferred. See also U.S. Pat. No. 4,588,457 to Crenshaw et al.

A microporous multilayer nonwoven material for medical applications is described in U.S. Pat. No. 4,618,524 to Groitzsch and Fahrbach. The material consists of a layer of microfibers covered on opposite sides with nonwoven layers, all of the layers being bonded together with a pattern of water repellent and, preferably, elastic paste members sufficiently penetrating through the layers.

A multilayer nonwoven fabric is disclosed in U.S. Pat. No. 4,668,566 to Braun. Such fabric comprises at least two layers of nonwoven web adjacent and bonded to each other. One of the layers is composed of polypropylene fibers and another of the layers is composed of polyethylene fibers.

U.S. Pat. No. 4,714,647 to Shipp, Jr. and Vogt describes a meltblown material with a depth fiber size gradient. The material is useful as a filter medium and is formed by sequentially depositing layers of meltblown thermoplastic fibers, having the same composition but different sizes, onto a collector. See also U.S. Pat. No. 4,904,521 to Johnson et al. which describes multi-layered nonwoven wiper having a number of interbonded meltblown layers, in which the inner layers have smaller average pore sizes for liquid-holding capacity.

U.S. Pat. No. 4,753,843 to Cook and Cunningham describes an absorbent, protective nonwoven fabric. The fabric has one or more center layers of meltblown polypropylene microfibers sandwiched between one or more meltblown surface layers. The surface layers are composed of meltblown polypropylene microfibers which have been rendered hydrophilic by spraying the fibers as they are formed with an aqueous solution of a nonionic surfactant.

A laminated fibrous web is described in U.S. Pat. No. 4,761,322 to Raley. The web comprises a first fibrous layer and a second fibrous layer, in which the second fibrous layer is bonded to and of lower density than the first fibrous layer. The fibers in the second fibrous layer are less bonded to one another than fibers in the first fibrous layer are bonded to one another. In addition, the first and second fibrous layers are less bonded to each other than fibers in the first fibrous layer are bonded to one another. Preferably, the fibrous layers are spunbonded nonwoven webs prepared from thermoplastic polymers, such as polypropylene, polyethylene, polyesters, polyamides, and polyurethanes. The bonding differences result from and are controlled by thermal pattern-bonding.

U.S. Pat. No. 4,766,029 to Brock et al. discloses a semi-permeable nonwoven laminate useful as a house wrap. The laminate consists of three layers. The two exterior layers are spunbonded polypropylene and the interior layer is a two-component meltblown layer of polyethylene and polypropylene. The laminate is calendared after formation.

A fabric for protective garments is described in U.S. Pat. No. 4,772,510 to McClure. The fabric comprises an outer polymeric film of poly(vinyl fluoride), poly(vinylidene fluoride), or copolymers thereof, bonded to a second film of poly(vinyl alcohol) polymer or copolymer which in turn is bonded to a textile fabric which preferably is a nonwoven fabric. Bonding of the various layers is accomplished by known techniques.

A multilayer nonwoven fabric is disclosed in U.S. Pat. No. 4,778,460 to Braun et al. The fabric comprises at least two layers of a nonwoven web, the fibers of at least one web having a bilobal cross-section. In a preferred embodiment, the fabric consists of two layers, with the fibers of the first web having a bilobal cross-section and the fibers of the second web having a trilobal or branched cross-section. In another preferred embodiment, the second layer is rendered wettable by either incorporating a wetting agent in the polymer before melt-extruding or applying a solution of a wetting agent to the nonwoven web after it is formed. The fibers can be prepared from a variety of polymers, with polyolefins being preferred. Suitable melt-extrusion processes include spunbonding and meltblowing, with spunbonding being preferred. The layers typically are stabilized by thermal bonding in discrete, compacted areas.

U.S. Pat. No. 4,784,892 to Storey and Maddern discloses a laminated nonwoven material which comprises a layer of a coformed nonwoven material, i.e., meltblown polymeric microfibers intermixed with wood pulp fibers, cellulose fibers, or absorbent or superabsorbent particles, and a layer of meltblown polymeric microfibers which also may be a coformed nonwoven material as already described. Preferably, the laminate comprises a coformed material sandwiched between to 5 meltblown layers. The layers are bonded together, such as by ultrasonic energy or heated calendaring rolls. Suitable polymers include polyethylene, polypropylene, polyester, and nylon, although polypropylene is preferred.

U.S. Pat. No. 4,818,585 to Shipp, Jr. describes an agricultural protective fabric which comprises at least two layers. The first layer is a spunbonded nonwoven web prepared from a polymer which is resistant to being degraded by the environment during the growing season. The second layer is a meltblown nonwoven web prepared from a polymer which degrades during the growing season. The first layer typically is prepared from polypropylene treated with ultraviolet light stabilizers; "treatment" apparently means incorporation into the polymer before melt-processing of an ultraviolet light stabilizing additive. The second layer is prepared from polypropylene which has not been so treated. Other polymers can be used for either or both layers and include polyethylene, polyester, nylon, and the like.

A health-care laminate is described in U.S. Pat. No. 4,818,597 to DaPonte et al. The laminate comprises five layers including a central meltblown nonwoven layer made from a polar polymer such as poly(ethylene-vinyl acetate). Insulative layers are disposed on both sides of the central layer. The insulative layers are nonwoven meltblown webs which are formed of the same or different nonpolar, heat-resistant thermoplastic polymers, such as polypropylene and polyethylene. Finally, outer layers on either side of the insulative layers are formed of nonwoven spunbonded webs. The outer layers may be prepared from the same or different thermoplastic polymer. Suitable polymers include polypropylene, polyethylene, ethylene-propylene copolymers, and polyethylene-polypropylene blends. The layers are calendared and embossed.

International Application No. PCT/GB87/00211, having Publication No. WO 87/05952, filed in the names of Maddern and Currie, describes a multilayer nonwoven fabric comprising at least one spunbonded layer which has been impregnated with a thermal stabilizing agent before hot calendaring one at least one side. The thermal stabilizing agent preferably is a fluorocarbon. The stabilizing agent is stated to form an antistatic and fluid-repellant coating and to resist surface fuzzing of the fabric.

Finally, U.S. Pat. No. 3,738,884 to Soehngen describes a nonwoven mat or fabric composed of partially overlapping regions aligned in the machine direction. While not a true multilayered structure as the term is used herein, it is noted at this point for the sake of completeness. The mat or fabric is produced by having several nozzles aligned generally in the cross direction. The spray patterns may overlap to the extent of intermingling filaments during the formation of the mat or fabric. Different materials may be sprayed simultaneously from the nozzles to give a fabric characterized by the presence of longitudinally extending portions or stripes having different visual or structural properties.

Notwithstanding the wide variety of multilayered structures already known, there still is a need for a multilayered structure composed of multiple nonwoven layers, in which the surface characteristics of the fibers making up the layers are determined at will at the time of the formation of the layers, without the need for any external or postformation treatment of any kind.

SUMMARY OF THE INVENTION

Accordingly, the present invention provides a nonwoven composite structure having at least two melt-extruded nonwoven layers which comprises:

(A) a first layer which comprises at least a portion of a first nonwoven web; and (B) a second layer adjacent to said first layer which comprises at least a portion of a second nonwoven web; in which, (1) the boundary between any two adjacent melt-extruded nonwoven layers is indistinct in that fibers at or near the surfaces of such adjacent layers are significantly intermingled;

(2) the fibers of at least one of said first and second layers are prepared by melt extrusion through a die at a shear rate of from about 50 to about 30,000 sec$^{-1}$ and a throughput of no more than about 5.4 kg/cm/hour of a mixture of an additive and a thermoplastic polymer, which additive (a) is present at a level of from about 0.05 to about 15 percent by weight, based on the amount of thermoplastic polymer, and (b) imparts to the surfaces of said fibers, as a consequence of the preferential migration of said additive to the surfaces of said fibers as they are formed, at least one characteristic which is different from the surface characteristics of fibers prepared from said thermoplastic polymer alone, said preferential migration taking place spontaneously upon the formation of said fibers without the need for a post-formation treatment of any kind;

(3) the additive present in any melt-extruded nonwoven layer does not migrate to an adjacent layer to s significant degree in use, so that the surface characteristics of each layer remain substantially as originally prepared; and (4) said composite has been pattern bonded by the application of heat and pressure.

The present invention also provides a method of preparing a nonwoven composite structure having at least two melt-extruded nonwoven layers adjacent to each other in which each melt-extruded nonwoven layer comprises at least a portion of a nonwoven web and the boundary between any two adjacent melt-extruded nonwoven layers is indistinct in that fibers at or near the surfaces of such adjacent layers are significantly intermingled, which method comprises the steps of:

(A) sequentially melt extruding one or more additional nonwoven webs directly onto a first melt-extruded nonwoven web; and (B) pattern bonding the resulting nonwoven composite by the application of heat and pressure; in which (1) the fibers of at least one melt-extruded nonwoven layer are prepared by melt extrusion through a die at a shear rate of from about 50 to about 30,000 sec$^{-1}$ and a throughput of no more than about 5.4 kg/cm/hour of a mixture of an additive and a thermoplastic polymer, which additive (a) is present at a level of from about 0.05 to about 15 percent by weight, based on the amount of thermoplastic polymer, and (b) imparts to the surfaces of said fibers, as a consequence of the preferential migration of said additive to the surfaces of said fibers as they are formed, at least one characteristic which is different from the surface characteristics of fibers prepared from said thermoplastic polymer alone, said preferential migration taking place spontaneously upon the formation of said fibers without the need for a post-formation treatment of any kind; and (2) the additive present in any melt-extruded nonwoven layer does not migrate to an adjacent layer to a significant degree in use, so that the surface characteristics of each layer remain substantially as originally prepared.

In general, the thermoplastic polymer is selected from the group consisting of polyolefins, polyesters, polyetheresters, and polyamides. In preferred embodiments, the thermoplastic polymer is a polyolefin or a polyester. Polyolefins are more preferred, with the preferred polyolefins being polyethylene and polypropylene.

DETAILED DESCRIPTION OF THE INVENTION

As used herein, the term "nonwoven composite structure" is meant to define a structure composed predominantly of melt-extruded nonwoven layers, at least two of which must be present and adjacent to each other. Layers other than melt-extruded nonwoven layers can be present, provided such layers are present for purposes not related to the surface characteristics of the melt-extruded nonwoven layers. For example, one or more air-laid or wet-laid tissue or other cellulosic fiber layers may be present to provide increased water absorbency. Alternatively, one or more layers of scrim or similar material may be present to add increased strength to the nonwoven composite structure.

The term "melt-extruded" as applied to a nonwoven layer is meant to include a nonwoven layer or web prepared by any melt-extrusion process for forming a nonwoven web in which melt-extrusion to form fibers is followed concurrently by web formation on a foraminous support. The term includes, among others, such well-known processes as meltblowing, coforming, spunbonding, and the like. By way of illustration only, such processes are exemplified by the following references:

(a) meltblowing references include, by way of example, U.S. Pat. Nos. 3,016,599 to R. W. Perry, Jr., 3,704,198 to J. S. Prentice, 3,755,527 to J. P. Keller et al., 3,849,241 to R. R. Butin et al., 3,978,185 to R. R. Butin et al., and 4,663,220 to T. J. Wisneski et al. See, also, V. A. Wente, "Superfine Thermoplastic Fibers", *Industrial and Engineering Chemistry*, Vol. 48, No. 8, pp. 1342–1346 (1956); V. A. Wente et al., "Manufacture of Superfine Organic Fibers", Navy Research Laboratory, Washington, D.C., NRL Report 4364 (111437), dated May 25, 1954, United States Department of Commerce, Office of Technical Services; and Robert R. Butin and Dwight T. Lohkamp, "Melt Blowing - A One-Step Web Process for New Nonwoven Products", *Journal of the Technical Association of the Pulp and Paper Industry*, Vol. 56, No.4, pp. 74–77 (1973);

(b) coforming references (i.e., references disclosing a meltblowing process in which fibers or particles are comingled with the meltblown fibers as they are formed) include U.S. Pat. Nos. 4,100,324 to R. A. Anderson et al. and 4,118,531 to E. R. Hauser; and (c) spunbonding references include, among others, U.S. Pat. Nos. 3,341,394 to Kinney, 3,655,862 to Dorschner et al., 3,692,618 to Dorschner et al., 3,705,068 to Dobo et al., 3,802,817 to Matsuki et al., 3,853,651 to Porte, 4,064,605 to Akiyama et al., 4,091,140 to Harmon, 4,100,319 to Schwartz, 4,340,563 to Appel and Morman, 4,405,297 to Appel and Morman, 4,434,204 to Hartman et al., 4,627,811 to Greiser and Wagner, and 4,644,045 to Fowells.

As already stated, the nonwoven composite structure of the present invention has at least two melt-extruded nonwoven layers, i.e., a first layer which comprises at least a portion of a first nonwoven web and a second layer adjacent to said first layer which comprises at least a portion of a second nonwoven web. Because such first and second layers need not be coterminous with each other or with any other layer which may be present, each layer is defined as comprising at least a portion of a nonwoven web.

In general, the required two nonwoven layers are formed by melt extrusion of a thermoplastic polymer. As used herein, the term "thermoplastic polymer" is meant to include a single polymer; blends or mixtures of two or more polymers of the same type or of different types; copolymers, including random, block, or graft copolymers; and the like. Examples of suitable thermoplastic polymers include, by way of illustration only, polyolefins, such as polyethylene, polypropylene, poly(1-butene), poly(2-butene), poly(1-pentene), poly(2-pentene),poly(3-methyl-1-pentene),poly(4-methyl-1-pentene), 1,2-poly-1,3-butadiene, 1,4-poly-1,3-butadiene,polyisoprene, polychloroprene, polyacrylonitrile, poly(vinyl acetate), poly(vinylidene chloride), polystyrene, and the like; polyesters, such as poly(ethylene terephthalate), poly(tetramethylene terephthalate), poly(cyclohexylene-1,4-dimethylene terephthalate) or poly(oxymethylene-1,4-cyclohexylenemethyleneoxyterephthaloyl), and the like; polyether-esters, such as poly(oxyethylene)-poly(butylene terephthalate), poly(oxytrimethylene)-poly(butylene terephthalate),- poly(oxytetramethylene)-poly(butylene terephthalate), poly(oxytetramethylene)-poly(ethylene terephthalate), and the like; and polyamides, such as poly(6-aminocaproic acid) or poly(ε-caprolactam), poly(hexamethylene adipamide), poly(hexamethylene sebacamide), poly(11-aminoundecanoic acid), and the like; and copolymers of the foregoing, such as acrylonitrile-butadiene-styrene (ABS) copolymers, and the like.

The thermoplastic polymer preferably is selected from the group consisting of polyolefins and polyesters. Polyolefins are more preferred. Even more preferred are those polyolefins which contain only hydrogen and carbon atoms and which are prepared by the addition polymerization of one or more unsaturated monomers. Examples of such polyolefins include, among others, polyethylene, polypropylene, poly(1-butene), poly(2-butene), poly(1-pentene), poly(2-pentene), poly(3-methyl-1-pentene), poly(4-methyl-1-pentene), 1,2-poly-1,3-butadiene, 1,4-poly-1,3-butadiene, polyisoprene, polystyrene, and the like. The most preferred polyolefins are polypropylene and polyethylene.

Said first layer and said second layer must be adjacent to each other. As used herein, the term "adjacent"

means that one surface of said first layer is substantially contiguous with a surface of said second layer. Thus, a third web which is not a melt-extruded nonwoven web cannot be interposed between said first layer and said second layer. However, a layer of scrim or similar material can be present therebetween, since the large open areas inherent in a scrim material permit said first and second layers to be substantially contiguous with each other.

Figure 1:
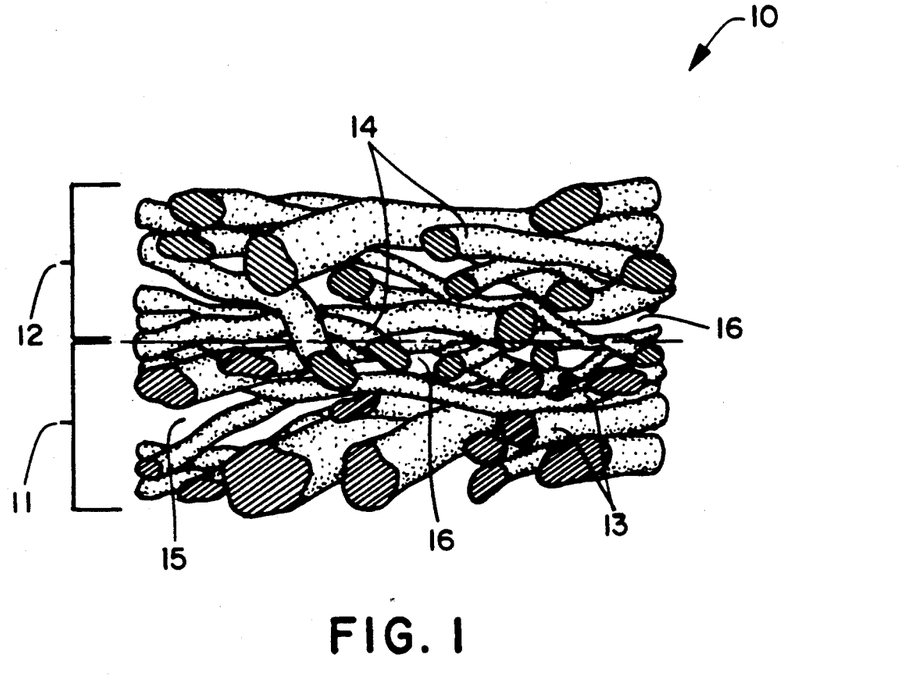
FIG. 1 is diagrammatic representation of a cross-sectional view of the composite structure of the present invention, enlarged to show individual fibers to illustrate the indistinct nature of the boundary between the first and second layers.

In addition, the boundary between any two adjacent melt-extruded nonwoven layers, including the boundary between said first and second layers, must be indistinct in that fibers at or near the surfaces of such layers are significantly intermingled. Such intermingling is simply the natural result of forming one melt-extruded nonwoven web directly on top of another melt-extruded nonwoven web. This requisite intermingling is illustrated in diagrammatic form by FIG. 1 which shows an enlarged boundary-area portion of a nonwoven composite structure of the present invention, which composite structure consists only of said first and second melt-extruded nonwoven webs. In FIG. 1, nonwoven composite structure 10 consists of melt-extruded nonwoven layer 11 and melt-extruded nonwoven layer 12. Melt-extruded nonwoven layer 11 is made up of fibers 13 and melt-extruded layer 12 is made up of fibers 14. Because of the random manner in which fibers 13 are laid down to form layer 11, internal voids 15 and surface voids 16 result. As layer 12 is formed on top of layer 11, fibers 14 are laid down randomly, with some of fibers 14 entering or partially filling surface voids 16 of layer 11. Consequently, the boundary between layer 11 and layer 12 is indistinct in that fibers 13 of layer 11 and fibers 14 of layer 12 at or near the surfaces of such layers are significantly intermingled.

In addition to the intermingling requirement, the fibers of at least one of said first and second layers are prepared by melt extrusion through a die at a shear rate of from about 50 to about 30,000 sec$^{-1}$ and a throughput of no more than about 5.4 kg/cm/hour of a mixture of an additive and a thermoplastic polymer, which additive (a) is present at a level of from about 0.05 to about 15 percent by weight, based on the amount of thermoplastic polymer, and (b) imparts to the surfaces of said fibers, as a consequence of the preferential migration of said additive to the surfaces of said fibers as they are formed, at least one characteristic which is different from the surface characteristics of fibers prepared from said thermoplastic polymer alone, said preferential migration taking place spontaneously upon the formation of said fibers without the need for a post-formation treatment of any kind.

As stated above, fibers are formed by extruding the molten mixture through a die. Although the nature of the die is not known to be critical, it most often will have a plurality of orifices arranged in one or more rows extending the full machine width. Such orifices may be circular or noncircular in cross-section. The fibers extruded may be either continuous or discontinuous.

In general, the shear rate will be in the range of from about 50 to about 30,000 sec$^{-1}$. Preferably, the shear rate will be in the range of from about 150 to about 5,000 sec$^{-1}$, and most preferably from about 300 to about 2,000 sec$^{-1}$.

Throughput is of importance because it affects the time the newly formed fiber is in a sufficiently molten or fluid state to allow migration or segregation of the additive toward the newly formed surfaces, even though throughput also affects the shear rate.

Throughput typically will be in the range of from about 0.01 to about 5.4 kg/cm/hour. Preferably, throughput will be in the range from about 0.1 to about 4.0 kg/cm./hour. The throughput most preferably will be in the range of from about 0.5 to about 2.5 kg/cm/hour.

As used herein, the phrase "molten state" does not necessarily mean "flowable". Rather, the term is used to denote a condition of the thermoplastic composition in which the additive molecules still are capable of migrating or segregating to the surface of the newly formed fiber. Thus, the term is somewhat imprecise and not readily subject to accurate measurement. Consequently, this composition fluidity factor preferentially is described or accounted for by the term "throughput".

The term "additive" is used throughout this specification and the claims to include a single compound or a mixture of two or more compounds. Moreover, the additive can be monomeric, oligomeric, or polymeric. While the additive can be either a liquid or a solid, a liquid is preferred. It also is preferred that a liquid additive have a surface tension which is less than that of virgin polymer; the lower surface tension assures that the additive will be more likely to completely "wet" or cover the surface of the fiber or film as the segregation process proceeds to completion, especially under conditions favoring a large concentration differential.

The nature of the additive is not known to be critical, provided the additive (1) migrates to the surfaces of the fibers as they are formed during the melt-extrusion process and (2) contains at least one functional group which imparts to the surfaces of the fibers at least one characteristic which is different from the surface characteristics of fibers prepared from the thermoplastic polymer alone. Examples of desired surface characteristics include, among others, hydrophilicity or water-wettability, alcohol repellency, hydrophobicity, antistatic properties, and the like. As a practical matter, the more desired surface characteristics are water-wettability (hydrophilicity), antistatic properties, and alcohol repellency.

Additives which impart wettability to the surfaces of the nonwoven fibers, as a consequence of the preferential migration of the additive to the surfaces of the fibers as they are formed, typically are siloxane-containing compounds. Preferably, the additive will have at least two moieties, A and B, in which:

(A) moiety A and moiety B act as a single molecular unit which is compatible with the polymer at melt extrusion temperatures but is incompatible at temperatures below melt extrusion temperatures, but each of moiety A and moiety B, taken as separate molecular units, is incompatible with the polymer at melt extrusion temperatures and at temperatures below melt extrusion temperatures; and (B) moiety B has at least one functional group which imparts water-wettability to the nonwoven fibers as they are formed by a melt-extrusion process.

More preferably, the siloxane-containing additive will have the general formula, in which:
(A) $R_1$-$R_9$ are independently selected monovalent $C_1$-$C_3$ alkyl groups;
(B) $R_{10}$ is hydrogen or a monovalent $C_1$-$C_3$ alkyl group;
(C) m represents an integer of from 1 to about 4;
(D) n represents an integer of from 0 to about 3;
(E) the sum of m and n is in the range of from 1 to about 4;
(F) p represents an integer of from 0 to about 5;
(G) x represents an integer of from 1 to about 10;
(H) y represents an integer of from 0 to about 5;
(I) the ratio of x to y is equal to or greater than 2; and
(J) said additive has a molecular weight of from about 350 to about 1,400.

In preferred embodiments, each of $R_1$-$R_{10}$ is a methyl group. In other preferred embodiments, $R_{10}$ is either hydrogen or a methyl group. In yet other preferred embodiments, m is either 1 or 2. In still other preferred embodiments, p is either 1 or 2, but most preferably is 2. In yet other preferred embodiments, y is 0 and x is 7 or 8.

Preferably, n will be 0, in which case the additive will have the general formula, in which each of $R_1$-$R_{10}$, m, p, x, and y are as already defined.

While the additive molecular weight can vary from about 350 to about 1,400, it preferably will not exceed about 1,000. Most preferably, the molecular weight will be in the range of from about 350 to about 700.

Examples of especially useful additives coming within general formula I are the following:

Additive A

Additive A is a trisiloxane polyether, PS-071, supplied by Petrarch Systems, Bristol, Pa. The material has the formula, The material has a theoretical molecular weight of 646. Based on gel permeation chromatography studies (American Polymer Standards Corporation, Mentor, Ohio) relative to PDMS standards, the following average molecular weights were calculated:
Weight-average molecular weight: 581
Number-average molecular weight: 544
Z-average molecular weight: 610
Polydispersity: 1.07
The material contained an estimated 3.6 percent low molecular weight material, based on total peak area and main peak area comparisons, and an estimated 10–16 percent free polyether.

Additive B

This additive also is a trisiloxane polyether, L-77, supplied by Union Carbide Corporation, Danbury, Conn., which differs from Additive A primarily in having one less oxyethylene group (i.e., n is 7, rather than 8).

The material has a theoretical molecular weight of 602. Based on gel permeation chromatography studies (American Polymer Standards Corporation, Mentor, Ohio) relative to PDMS standards, the following average molecular weights were calculated:
Weight-average molecular weight: 557
Number-average molecular weight: 480
Z-average molecular weight: 614
Polydispersity: 1.16
The material contained an estimated 7.8 percent low molecular weight material, based on total peak area and main peak area comparisons, and an estimated 20–25 percent free polyether.

Additive C

Additive C is a polysiloxane polyether, T-5878, supplied by Th. Goldschmidt AG, Essen, Federal Republic of Germany. The material is essentially the same as Additive A.

Based on gel permeation chromatography studies (American Polymer Standards Corporation, Mentor, Ohio) relative to PDMS standards, the following average molecular weights were calculated:
Weight-average molecular weight: 602
Number-average molecular weight: 527
Z-average molecular weight: 672
Polydispersity: 1.14
The material contained an estimated 9.8 percent low molecular weight material, based on total peak area and main peak area comparisons, and an estimated 20–25 percent free polyether.

Additive D

This additive is another trisiloxane polyether, T-5847, which differs from Additive A primarily in having two additional oxyethylene groups (i.e., n is 10, rather than 8), and two oxypropylene groups (not shown in the formula for Additive A). In addition, the terminal group of the poly(oxyalkylene) moiety is hydrogen rather than a methyl group.

The material has a theoretical molecular weight of 790, a weight-average molecular weight of 836, and a polydispersity of 1.20. It is supplied by Th. Goldschmidt AG.

Additive E

The additive is a trisiloxane polyether, G-1255, supplied by Th. Goldschmidt AG, Essen. The material is similar to Additive A, except that the polyether moiety consists of six ethyleneoxy units and is not end-capped, the weight-average molecular weight is 610, and the polydispersity is 1.09. The material contained about 11 percent by weight of free polyether.

Additive F

Additive F is a polysiloxane polyether having the formula,

The material is available from Th. Goldschmidt Ag, Essen, Federal Republic of Germany, as T-3004. It has a molecular weight of 852 and a viscosity at 25° of 23 centistokes. A 1 percent by weight aqueous solution of the additive has a cloud point of less than 3° and a surface tension of 25.2±1.5 dynes/cm.

While antistatic properties can be provided by a number of additives, it has been found that some additives which provide water-wettability also can impart antistatic properties. For example, Additive E can render a nonwoven web water-wettable at additive levels as low as 0.3 percent by weight, based on the amount of thermoplastic polymer. At a level of about 1.5 percent by weight, however, the resulting nonwoven web not only is water-wettable, but it also exhibits antistatic properties.

Alcohol-repellant additives typically are fluorine-containing materials. Examples of especially suitable fluorine-containing additives are the following:

Additive G

This additive is a perfluoroalkyl urethane, L-8977, which is available from 3M Company, St. Paul, Minn. The material is a white powder having a melting point of 130°–138° C. No other information regarding the material is available.

Additive H

This additive is similar to Additive G and is available from the same source as L-8982. No information regarding the material is available.

Additive I

Additive I is any one of the Krytox TM polymers obtained by the condensation polymerization of perfluoropropylene oxide. The materials are available from E. I. duPont de Nemours & Company, Wilmington, Del.

Additive J

The additive, MPD-7901, available from duPont, is a 2-perfluoroalkylethyl acetate. It has a melting point of 23°–24° C. and negligible solubility in water.

Additive K

This additive is a 2-perfluoroalkylethyl hexanoate, available from duPont as MPD-7902. It has a melting point of 30°–50° C. and negligible solubility in water.

Additive L

Additive L is MPD-7903, available from duPont. The material is an addition copolymer consisting of 85 mole-percent 2-perfluoroalkylethyl methacrylate and 15 mole-percent 2-diethylaminoethyl methacrylate. The material has negligible solubility in water.

Additive M

This additive, MPD-7708, is an addition copolymer of 2-perfluoroalkylethyl methacrylate and 2-ethylhexyl methacrylate. The material is available from duPont. It is a weakly acidic tacky solid having a melting point of 62°–72° C. The material is dispersible in water.

Additive N

The additive, MPD-7709, is available from duPont and is a perfluoroalkyl-substituted urethane mixture. The material is a crystalline solid which is dispersible in water. It has a melting point of 88°–95° C.

Additive O

This additive is Telomer TM B Citrate or Zonyl® TBC, available from duPont. The material is a 2-perfluoroalkyl-ethyl citrate. It is waxy solid having a melting point of 50°–80° C. and negligible solubility in water. It has a specific gravity of 1.5 at 25° C.

Additive P

Additive P is Telomer TM B Citrate Urethane, available from duPont.

Additive Q

The additive, available from duPont, is Zonyl TM FTS, a 2-perfluoroalkylethyl stearate. The material has a melting point of 30°–45° C., with negligible solubility in water.

Additive R

This additive is Zonyl TM TBS, available from duPont. The material is a mixture of a 2-perfluoroalkylethylsulfonic acid and its ammonium salt.

Additive S

Additive S is Zonyl TM UR. The material, available from duPont, is a 2-perfluoroalkylethylphosphate having an unknown cation.

In general, additive will be present in a melt-extruded nonwoven web in an amount of from about 0.05 to about 15 percent by weight, based on the amount of thermoplastic polymer from which the web is formed. As a practical matter, additive levels of from about 0.1 to about 5 percent by weight are preferred, with additive levels of from about 0.1 to about 2 percent by weight being most preferred.

As already noted, the additive preferentially migrates to the surfaces of the melt-extruded fibers as they are formed. Thus, the additive imparts to the surfaces of the fibers at least one characteristic which is different from the surface characteristics of fibers prepared in the absence of the additive. However, the additive present in any melt-extruded nonwoven layer must not migrate to an adjacent layer to a significant degree in use, so that the surface characteristics of each layer remain substantially as originally prepared. That is, once having migrated to the surfaces of the fibers, significant further migration to an adjacent layer does not occur.

Finally, the nonwoven composite structure is pattern bonded by the application of heat and pressure. Preferably, such application of heat and pressure will be in the ranges of from about 80° C. to about 180° C. and from about 150 to about 1,000 pounds per linear inch (59–178 kg/cm), respectively. More preferably, a pattern having from about 10 to about 250 bonds/inch$^2$ (1–40 bonds/cm$^2$) covering from about 5 to about 30 percent of the wipe surface area will be employed.

Such pattern bonding is accomplished in accordance with known procedures. See, for example, U.S. Des.

Pat. No. 239,566 to Vogt, U.S. Des. Pat. No. 264,512 to Rogers, U.S. Pat. No. 3,855,046 to Hansen et al., and U.S. Pat. No. 4,493,868 to Meitner for illustrations of bonding patterns and a discussion of bonding procedures.

Figure 2:
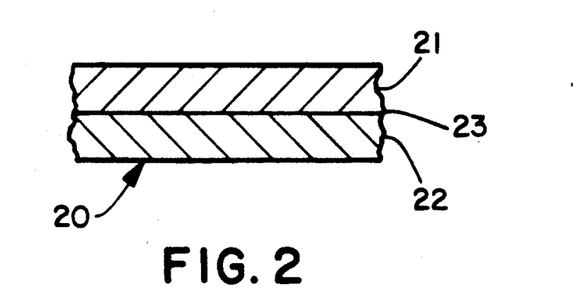
FIGS. 2 and 3 are diagrammatic representations of cross-sectional views of preferred embodiments of the present invention.
Figure 3:
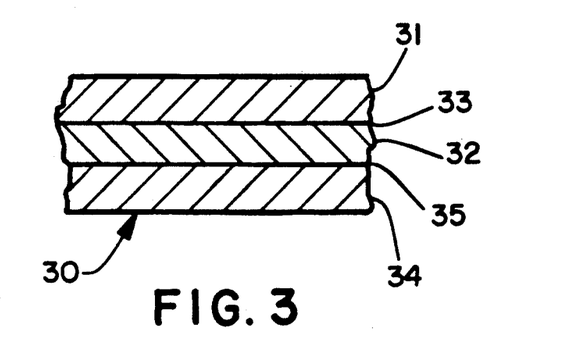

In view of the foregoing description, it should be apparent that numerous combinations and permutations of the present invention are possible, two of which are illustrated by FIGS. 2 and 3.

The most basic embodiment of the present invention is illustrated by FIG. 2 which is a cross-sectional representation of a composite structure of the present invention having two layers. In FIG. 2, composite structure 20 consists of melt-extruded nonwoven layers 21 and 22 having indistinct boundary 23. Examples of combinations of layers 21 and 22 which come within the scope of the present invention include, among others, the following:

Combination 2-1

Layer 21: A polypropylene meltblown web.
Layer 22: A polypropylene meltblown web containing an additive which renders the fibers hydrophilic (water-wettable).

Combination 2-2

Layer 21: A polyethylene meltblown web.
Layer 22: A polypropylene meltblown web containing an additive which renders the fibers hydrophilic (water-wettable).

Combination 2-3

Layer 21: A polypropylene spunbonded web.
Layer 22: A polypropylene meltblown web containing an additive which renders the fibers hydrophilic (water-wettable).

Combination 2-4

Layer 21: A polypropylene meltblown web.
Layer 22: A polypropylene spunbonded web containing an additive which renders the fibers hydrophilic (water-wettable).

Combination 2-5

Layer 21: A polypropylene spunbonded web.
Layer 22: A polypropylene spunbonded web containing an additive which renders the fibers hydrophilic (water-wettable).

Combination 2-6

Layer 21: A polypropylene meltblown web.
Layer 22: A polypropylene meltblown web containing an additive which renders the fibers alcohol repellant.

Combination 2-7

Layer 21: A coformed web in which wood pulp has been comingled with meltblown polypropylene fibers.
Layer 22: A polypropylene meltblown web containing an additive which renders the fibers hydrophilic (water-wettable).

Combination 2-8

Layer 21: A polypropylene meltblown web.
Layer 22: A coformed web in which wood pulp has been comingled with polypropylene meltblown fibers containing an additive which renders the fibers hydrophilic (water-wettable).

Combination 2-9

Layer 21: A polypropylene meltblown web containing an additive which renders the fibers alcohol repellant.
Layer 22: A polypropylene meltblown web containing an additive which renders the fibers hydrophilic (water-wettable).

Combination 2-10

Layer 21: A polypropylene spunbonded web containing an additive which renders the fibers alcohol repellant.
Layer 22: A polypropylene spunbonded web containing an additive which renders the fibers hydrophilic (water-wettable).

If desired to give added strength to the composite structure, a layer of scrim can be placed between layers 21 and 22. As used herein, the term "scrim" is meant to include any open-mesh material, whether woven or nonwoven, which generally is used as a reinforcing material. For an example of a nonwoven scrim material, see, by way of illustration only, U.S. Pat. No. 3,652,374 to Condon.

A cross-sectional representation of a three-layer nonwoven composite structure is shown in FIG. 3. In FIG. 3, composite structure 30 consists of melt-extruded nonwoven layers 31 and 32 having indistinct boundary 33. Third layer 34 is located adjacent to layer 32, and layers 32 and 34 have boundary 35 which may be either indistinct or distinct. If either of layers 32 and 34 is melt-extruded directly onto the other, boundary 35 will be indistinct. However, if layers 32 and 34 are brought together after being formed, then boundary 35 will be distinct; that is, the fibers at or near the surfaces of the two layers will not be significantly intermingled.

Examples of combinations of layers 31, 32, and 34 include, among others, the following (boundary 33 between layers 31 and 32 is indistinct in each combination):

Combination 3-1

Layer 31: A polypropylene meltblown web.
Layer 32: A polypropylene meltblown web containing an additive which renders the fibers hydrophilic (water-wettable).
Layer 34: A polypropylene meltblown web.
Boundary 35: Indistinct.

Combination 3-2

Layer 31: A polyethylene meltblown web.
Layer 32: A polypropylene meltblown web containing an additive which renders the fibers hydrophilic (water-wettable).
Layer 34: A polypropylene spunbonded web.
Boundary 35: Indistinct.

Combination 3-3

Layer 31: A polypropylene meltblown web.
Layer 32 A polypropylene meltblown web containing an additive which renders the fibers alcohol repellant.
Layer 34: A polyethylene meltblown web.
Boundary 35: Indistinct.

Combination 3-4

Layer 31: A polyethylene meltblown web.
Layer 32: A polypropylene meltblown web containing an additive which renders the fibers hydrophilic (water-wettable).
Layer 34: A polyethylene meltblown web.

Boundary 35: Indistinct.

Combination 3-5

Layer 31: A polypropylene meltblown web.
Layer 32: A polypropylene meltblown web containing an additive which renders the fibers hydrophilic (water-wettable).
Layer 34: A polyester bonded carded web.
Boundary 35: Distinct.

Combination 3-6

Layer 31: A polypropylene meltblown web containing an additive which renders the fibers hydrophilic (water-wettable).
Layer 32: A polypropylene meltblown web containing an additive which renders the fibers alcohol repellant.
Layer 34: A coformed web in which wood pulp has been comingled with polypropylene meltblown fibers.
Boundary 35: Indistinct.

Combination 3-7

Layer 31: A polypropylene spunbonded web.
Layer 32: A polypropylene meltblown web containing an additive which renders the fibers hydrophilic (water wettable).
Layer 34: A polypropylene spunbonded web.
Boundary 35: Indistinct.

Combination 3-8

Layer 31: A polypropylene spunbonded web.
Layer 32: A polypropylene meltblown web containing an additive which renders the fibers alcohol repellant.
Layer 34: A polypropylene spunbonded web.
Boundary 35: Indistinct.

Combination 3-9

Layer 31: A polypropylene spunbonded web containing an additive which renders the fibers alcohol repellant.
Layer 32: A polypropylene meltblown web.
Layer 34: A polypropylene spunbonded web containing an additive which renders the fibers alcohol repellant.
Boundary 35: Indistinct.

If desired, a layer of scrim can be placed between layers 31 and 32 and/or between layers 32 and 34 in any of the foregoing combinations.

In general, the number of layers in the nonwoven composite structure of the present invention is limited only by cost and performance considerations. In some cases, more than three layers will be appropriate. For example, a medical fabric often is constructed of at least three layers as represented by combinations 3-7, 3-8, and 3-9, by way of illustration only. Such a combination, often referred to as an SMS composite, couples the barrier properties of a meltblown web with the strength and abrasion resistance of spunbonded webs. The use of additional meltblown layers, for example, permits the retention of the basic features of an SMS composite while at the same time taking advantage of the differentiation in surface properties permitted by the present invention.

By way of illustration, one embodiment of a five-layer medical fabric consists of three central meltblown layers sandwiched between two outer spunbonded layers. All of the layers except the center-most meltblown layer contain an additive which renders the fibers alcohol repellant. The center-most meltblown layer contains an additive which renders the fibers antistatic. Alternatively, all but one of the outer spunbonded layers can contain an additive which renders the fibers alcohol repellant, with the remaining outer spunbonded layer containing an additive which renders the fibers antistatic.

In general, the nonwoven composite structure of the present invention is made by the method which comprises the steps of:

(A) sequentially melt extruding one or more additional nonwoven webs directly onto a first melt-extruded nonwoven web; and (B) pattern bonding the resulting nonwoven composite by the application of heat and pressure; in which (1) the fibers of at least one melt-extruded nonwoven layer are prepared by melt extrusion through a die at a shear rate of from about 50 to about 30,000 sec$^{-1}$ and a throughput of no more than about 5.4 kg/cm/hour of a mixture of an additive and a thermoplastic polymer, which additive imparts to the surfaces of said fibers, as a consequence of the preferential migration of said additive to the surfaces of said fibers as they are formed, at least one characteristic which is different from the surface characteristics of fibers prepared from said thermoplastic polymer alone, said preferential migration taking place spontaneously upon the formation of said fibers without the need for a post-formation treatment of any kind; and (2) the additive present in any melt-extruded nonwoven layer does not migrate to an adjacent layer to a significant degree in use, so that the surface characteristics of each layer remain substantially as originally prepared.

As indicated earlier, the formation of a melt-extruded nonwoven web is carried out by methods well known to those having ordinary skill in the art, such as by meltblowing, coforming, and spunbonding.

The sequential melt-extrusion of one or more additional nonwoven webs directly onto a first melt-extruded nonwoven web also can be carried out in accordance with known procedures. For example, a second nonwoven web can be melt-extruded directly onto a first, preformed nonwoven web. Alternatively, both a first nonwoven web and a second nonwoven web can be melt-extruded sequentially on a multiple-bank melt-extrusion apparatus. See, by way of example only, U.S. Pat. Nos. 4,714,647 to Shipp, Jr. et al., 4,761,322 to Raley, 4,766,029 to Brock et al., 4,778,460 to Braun et al., 4,784,892 to Maddern et al., 4,818,585 to Shipp, Jr., and 4,818,597 to DaPonte et al., each of which is incorporated herein by reference. The pattern bonding of the resulting nonwoven composite then is accomplished as already described.

The present invention is further described by the example which follows. Such example, however, is not to be construed as limiting in any way either the spirit or scope of the present invention. In the example, all temperatures are in degrees Celsius and all parts are by weight unless stated otherwise.

EXAMPLE

Preparation of a Composite Structure Having Combination 2-10

The thermoplastic polymer employed in this example was Type PF-444 polypropylene (Himont Incorporated, Wilmington, Del.) having a melt flow rate of 60 as determined by ASTM Test Method D1238-82, "Standard Test Method for Flow Rates of Thermoplastics by Extrusion Plastometer". According to the manufacturer, the polymer had number average molecular weight of 30,000 and a polydispersity of 4.0.

A Henschel Fluidizing Mixer (Model FM 10 "C", Thyssen Henschel, 3500 Kassel 2 Postfach 102969, Federal Republic of Germany) was charged with polypropylene granules and 1.0 percent by weight, based on the amount of polypropylene, of Additive G. The mixer was run until the temperature reached about 140°.

A spunbonded web was prepared from the resulting coated polypropylene granules on a small pilot-scale apparatus essentially as described in U.S. Pat. No. 3,341,394 to Kinney as modified by U.S. Pat. No. 3,655,862 to Dorschner et al., both of which patents being incorporated herein by reference. The apparatus utilized a barrel having three heating zones. The web was formed on a polyethylene spunbonded web having a basis weight of about 19 grams per square meter (g/m$^2$ or gsm) which served as a carrier sheet. The resulting web was compressed and rolled.

The basic process parameters were as follows:
Barrel zone 1 temperature, 212°;
Barrel zone 2 temperature, 228°;
Barrel zone 3 temperature, 230°;
Barrel pressure, 410–480 psi;
Spin pump temperature, 233°; and
Spin pump pressure, 89–98 psi.

The line speed was about 7 feet per minute (about 3.6 cm/sec), which resulted in a web having a basis weight of about 71 gsm.

A second spunbonded web was produced in a similar manner, except that additive G was replaced with 1.5 percent by weight, based on the amount of polypropylene, of additive F.

The basic process parameters for the second spunbonded web were as follows:
Barrel zone 1 temperature, 212°;
Barrel zone 2 temperature, 226°;
Barrel zone 3 temperature, 231°;
Barrel pressure, 250–300 psi;
Spin pump temperature, 233°; and
Spin pump pressure, 98–110 psi.

As before, the line speed was about 7 feet per minute (about 3.6 cm/sec), again resulting in a web having a basis weight of about 71 gsm. The web was formed on the first web by unrolling the first web/carrier sheet combination at a rate equal to the line speed of the spunbonding apparatus. The resulting two-layer nonwoven composite structure/carrier sheet combination was pattern bonded essentially as described in U.S. Pat. No. 3,885,046 to Hansen et al., supra. The bonding temperature was 135° and the calendar roll temperature was 104°. The gauge pressure for the bonding roll was 15 psi. The bonding line speed was 7 feet per minute (about 3.6 cm/sec). The bond pattern had 107 bonds/inch$^2$ (about 16.6 bonds/cm$^2$), with the bonded portions constituting about 14 percent of the total surface area.

After bonding, the carrier sheet was readily removed from the two-layer nonwoven composite structure. Such structure had one layer which was alcohol repellant and another layer which was water-wettable or hydrophilic.

Having thus described the invention, numerous changes and modifications thereof will be apparent to those having ordinary skill in the art without departing from the spirit or scope of the invention.

What is claimed is:

1. A nonwoven composite structure having at least two melt-extruded nonwoven layers which comprises:
   (A) a first layer which comprises at least a portion of a first nonwoven web; and
   (B) a second layer adjacent to said first layer which comprises at least a portion of a second nonwoven web;
   in which,
   (1) the boundary between any two adjacent melt-extruded nonwoven layers is indistinct in that fibers at or near the surfaces of such adjacent layers are significantly intermingled;
   (2) the fibers of at least one of said first and second layers are prepared by melt extrusion through a die at a shear rate of from about 50 to about 30,000 sec$^{-1}$ and a throughput of no more than about 5.4 kg/cm/hour of a mixture of an additive and a thermoplastic polymer, which additive imparts to the surfaces of said fibers, as a consequence of the preferential migration of said additive to the surfaces of said fibers as they are formed, at least one characteristic which is different from the surface characteristics of fibers prepared from said thermoplastic polymer alone, said preferential migration taking place spontaneously upon the formation of said fibers without the need for a post-formation treatment of any kind;
   (3) the additive present in any melt-extruded nonwoven layer does not migrate to an adjacent layer to a significant degree in use, so that the surface characteristics of each layer remain substantially as originally prepared;
   (4) said thermoplastic polymer is selected from the group consisting of polyolefins, polyesters, polyetheresters, and polyamides; and
   (5) said composite has been pattern bonded by the application of heat and pressure.

2. The nonwoven composite structure of claim 1, in which said thermoplastic polymer is a polyolefin or a polyester.

3. The nonwoven composite structure of claim 2, in which said thermoplastic polymer is polyethylene or polypropylene.

4. The nonwoven composite structure of claim 3, in which the fibers of said at least one layer are hydrophilic.

5. The nonwoven composite structure of claim 4, in which said additive is a siloxane-containing additive.

6. The nonwoven composite structure of claim 5, in which said siloxane-containing additive has at least two moieties, A and B, in which:
   (A) said additive is compatible with said thermoplastic polymer at melt extrusion temperatures but is incompatible at temperatures below melt extrusion temperatures, but each of moiety A and moiety B, if present as separate compounds, would be incompatible with said thermoplastic polymer at melt extrusion temperatures and at temperatures below melt extrusion temperatures;
   (B) moiety B has at least one functional group which is a poly(oxyalkylene) moiety;
   (C) the molecular weight of said additive is in the range of from about 400 to about 15,000; and
   (D) said additive is present at a level of from about 0.05 to about 15 percent by weight, based on the amount of thermoplastic polymer.

7. The nonwoven composite structure of claim 3, in which the fibers of said at least one layer are alcohol repellant.

8. The nonwoven composite structure of claim 7, in which said additive is a fluorocarbon compound.

9. The nonwoven composite structure of claim 1, in which said first layer comprises fibers prepared by melt extrusion of a first thermoplastic polymer and said second layer comprises fibers prepared by melt extrusion of a second thermoplastic polymer.

10. The nonwoven composite structure of claim 9, in which said first thermoplastic polymer and said second thermoplastic polymer are the same.

11. The nonwoven composite structure of claim 1, in which said composite has been pattern bonded by the application of heat and pressure in the ranges of from about 80° C. to about 180° C. and from about 150 to about 1,000 pounds per linear inch, respectively, employing a pattern with from about 10 to about 250 bonds/inch$^2$ (1–40 bonds/cm$^2$) covering from about 5 to about 30 percent of the wipe surface area.

12. The nonwoven composite structure of claim 1, in which said structure consists essentially of a center polypropylene meltblown layer sandwiched between two polypropylene spunbonded layers, in which:
    (A) the boundaries between adjacent layers are indistinct; and
    (B) said meltblown layer contains an additive which renders the fibers alcohol repellant.

13. The nonwoven composite structure of claim 12, in which said composite has been pattern bonded by the application of heat and pressure in the ranges of from about 80° C. to about 180° C. and from about 150 to about 1,000 pounds per linear inch, respectively, employing a pattern with from about 10 to about 250 bonds/inch$^2$ (1–40 bonds/cm$^2$) covering from about 5 to about 30 percent of the wipe surface area.

14. The nonwoven composite structure of claim 1, in which said structure consists essentially of the following five layers in the order given:
    (A) a polypropylene spunbonded layer which contains an additive which renders the fibers alcohol repellant;
    (B) a polypropylene meltblown layer which contains an additive which renders the fibers alcohol repellant;
    (C) a polypropylene meltblown layer which contains an additive which renders the fibers antistatic;
    (D) a polypropylene meltblown layer which contains an additive which renders the fibers alcohol repellant; and
    (E) a polypropylene spunbonded layer which contains an additive which renders the fibers alcohol repellant;
in which the boundaries between adjacent layers are indistinct.

15. The nonwoven composite structure of claim 14, in which said composite has been pattern bonded by the application of heat and pressure in the ranges of from about 80° C. to about 180° C. and from about 150 to about 1,000 pounds per linear inch, respectively, employing a pattern with from about 10 to about 250 bonds/inch$^2$ (1–40 bonds/cm$^2$) covering from about 5 to about 30 percent of the wipe surface area.

16. The nonwoven composite structure of claim 1, in which said structure consists essentially of the following five layers in the order given:
    (A) a polypropylene spunbonded layer which contains an additive which renders the fibers alcohol repellant;
    (B) a polypropylene meltblown layer which contains an additive which renders the fibers alcohol repellant;
    (C) a polypropylene meltblown layer which contains an additive which renders the fibers alcohol repellant;
    (D) a polypropylene meltblown layer which contains an additive which renders the fibers alcohol repellant; and
    (E) a polypropylene spunbonded layer which contains an additive which renders the fibers antistatic;
in which the boundaries between adjacent layers are indistinct.

17. The nonwoven composite structure of claim 16, in which said composite has been pattern bonded by the application of heat and pressure in the ranges of from about 80° C. to about 180° C. and from about 150 to about 1,000 pounds per linear inch, respectively, employing a pattern with from about 10 to about 250 bonds/inch$^2$ (1–40 bonds/cm$^2$) covering from about 5 to about 30 percent of the wipe surface area.

18. A method of preparing a nonwoven composite structure having at least two melt-extruded nonwoven layers adjacent to each other in which each melt-extruded nonwoven layer comprises at least a portion of a nonwoven web and the boundary between any two adjacent melt-extruded nonwoven layers is indistinct in that fibers at or near the surfaces of such adjacent layers are significantly intermingled, which method comprises the steps of:
    (A) sequentially melt extruding one or more additional nonwoven webs directly onto a first melt-extruded nonwoven web; and
    (B) pattern bonding the resulting nonwoven composite by the application of heat and pressure;
in which
    (1) the fibers of at least one melt-extruded nonwoven layer are prepared by melt extrusion through a die at a shear rate of from about 50 to about 30,000 sec$^{-1}$ and a throughput of no more than about 5.4 kg/cm/hour of a mixture of an additive and a thermoplastic polymer, which additive imparts to the surfaces of said fibers, as a consequence of the preferential migration of said additive to the surfaces of said fibers as they are formed, at least one characteristic which is different from the surface characteristics of fibers prepared from said thermoplastic polymer alone, said preferential migration taking place spontaneously upon the formation of said fibers without the need for a post-formation treatment of any kind;
    (2) said thermoplastic polymer is selected from the group consisting of polyolefins, polyesters, polyetheresters, and polyamides; and
    (3) the additive present in any melt-extruded nonwoven layer does not migrate to an adjacent layer to a significant degree in use, so that the surface characteristics of each layer remain substantially as originally prepared.

19. The method of claim 18, in which said thermoplastic polymer is a polyolefin or a polyester.

20. The method of claim 19, in which said thermoplastic polymer is polyethylene or polypropylene.

21. The method of claim 18, in which said first layer comprises fibers prepared by melt extrusion of a first thermoplastic polymer and said second layer comprises fibers prepared by melt extrusion of a second thermoplastic polymer.

22. The method of claim 21, in which each of said first thermoplastic polymer and said second thermoplastic polymer is a polyolefin or a polyester.

23. The method of claim 22, in which each of said first thermoplastic polymer and said second thermoplastic polymer is the same polyolefin or polyester.

24. The method of claim 18, in which said nonwoven composite structure has been pattern bonded by the application of heat and pressure in the ranges of from about 80° C. to about 180° C. and from about 150 to about 1,000 pounds per linear inch, respectively, employing a pattern with from about 1 10 to about 250 bonds/inch$^2$ (1–40 bonds/cm$^2$) covering from about 5 to about 30 percent of the wipe surface area.

25. An article of manufacture which comprises the nonwoven composite structure of claim 1.

26. An article of manufacture which comprises the nonwoven composite structure of claim 2.

27. An article of manufacture which comprises the nonwoven composite structure of claim 13.

28. An article of manufacture which comprises the nonwoven composite structure of claim 15.

29. An article of manufacture which comprises the nonwoven composite structure of claim 17.

* * * * *